United States Patent
Kulkarni et al.

(10) Patent No.: US 9,373,988 B2
(45) Date of Patent: Jun. 21, 2016

(54) ASSEMBLIES AND METHODS FOR COOLING ELECTRIC MACHINES

(71) Applicant: TECO Westinghouse Motor Company, Round Rock, TX (US)

(72) Inventors: Devdatta P. Kulkarni, Austin, TX (US); Gabriel Rupertus, Austin, TX (US); Edward Kuan-Chen Chen, Austin, TX (US); Ramon Guitart, Round Rock, TX (US); Lex Ramsey, Austin, TX (US)

(73) Assignee: TECO-Westinghouse Motor Company, Round Rock, TX (US)

( * ) Notice: Subject to any disclaimer, the term of this patent is extended or adjusted under 35 U.S.C. 154(b) by 174 days.

(21) Appl. No.: 13/834,201

(22) Filed: Mar. 15, 2013

(65) Prior Publication Data

US 2014/0265660 A1 Sep. 18, 2014

(51) Int. Cl.
- *H02K 9/00* (2006.01)
- *H02K 9/19* (2006.01)
- *H02K 3/24* (2006.01)
- *H02K 9/22* (2006.01)
- *H02K 1/24* (2006.01)

(52) U.S. Cl.
CPC .. *H02K 9/19* (2013.01); *H02K 3/24* (2013.01); *H02K 9/22* (2013.01); *H02K 1/24* (2013.01)

(58) Field of Classification Search
CPC .................................. H02K 4/04; H02K 9/20
USPC ................................ 310/52, 54, 58, 60 A, 61
See application file for complete search history.

(56) References Cited

U.S. PATENT DOCUMENTS

| | | | |
|---|---|---|---|
| 3,032,665 A | 5/1962 | Wilhelmson | 310/54 |
| 3,034,003 A | 5/1962 | Seidner | 310/61 |
| 3,261,995 A * | 7/1966 | Kohn | 310/64 |
| 3,801,843 A | 4/1974 | Corman et al. | 310/52 |
| 3,891,877 A | 6/1975 | Shapiro et al. | 310/61 |
| 3,908,140 A | 9/1975 | Fidei et al. | 310/54 |
| 3,916,230 A | 10/1975 | Albaric et al. | 310/61 |
| 3,939,368 A | 2/1976 | Albaric et al. | 310/59 |
| 3,983,427 A | 9/1976 | Ulke | 310/61 |
| 4,118,646 A * | 10/1978 | Fleming et al. | 310/58 |
| 5,189,325 A | 2/1993 | Jarczynski | 310/54 |
| 5,973,427 A | 10/1999 | Suzuki et al. | 310/54 |
| 6,509,665 B1 * | 1/2003 | Nishiyama et al. | 310/215 |
| 6,809,441 B2 | 10/2004 | Randall | 310/54 |
| 8,242,644 B2 | 8/2012 | Booth et al. | 310/52 |
| 2002/0167232 A1 | 11/2002 | Randall | 310/54 |
| 2003/0193256 A1* | 10/2003 | Liebermann | 310/194 |
| 2005/0248222 A1 | 11/2005 | Evangelos et al. | 310/54 |
| 2006/0043801 A1 | 3/2006 | Adra | 310/54 |
| 2007/0228846 A1 | 10/2007 | Rao | 310/52 |
| 2008/0197724 A1 | 8/2008 | Cullen et al. | 310/53 |
| 2009/0072654 A1 | 3/2009 | Hatano et al. | 310/215 |
| 2011/0309695 A1* | 12/2011 | Huard | 310/46 |

FOREIGN PATENT DOCUMENTS

| | | |
|---|---|---|
| DE | 10211006681 A1 * | 10/2012 |
| GB | 1201340 | 8/1970 |
| JP | 9-154272 | 6/1997 |
| JP | 10-80084 | 3/1998 |

* cited by examiner

*Primary Examiner* — Jose Gonzalez Quinone
(74) *Attorney, Agent, or Firm* — Norton Rose Fulbright US LLP

(57) ABSTRACT

Cooling assemblies, such as those configured to cool electric machines (e.g., electric motors and generators) and components of electric machines (e.g., rotors and stators).

8 Claims, 7 Drawing Sheets

ASSEMBLIES AND METHODS FOR COOLING ELECTRIC MACHINES

BACKGROUND

1. Field of the Invention

The present invention relates generally to cooling assemblies, and more particularly, but not by way of limitation, to cooling assemblies configured to cool electric machines and components of electric machines, such as rotors and stators.

2. Description of Related Art

Examples of cooling assemblies are shown in, for example, U.S. Pat. Nos. 3,032,665; 3,034,003; 3,939,368; 5,189,325; and 8,212,437.

SUMMARY

This disclosure includes embodiments of cooling assemblies that are configured to cool electric machines, such as electric motors and generators, and components of electric machines, such as rotors and stators.

Some embodiments of the present cooling assemblies comprise a rotor comprising a rotor core having a first end, a second end, and a rotor bore extending from the first end to the second end; rotor poles extending at least partially from the first end to the second end of the rotor core, each rotor pole having sides; and a rotor winding associated with each rotor pole. Some embodiments of the present cooling assemblies further comprise a tube disposed between a rotor pole and the rotor winding associated with that rotor pole. Other embodiments of the present cooling assemblies further comprise a tube disposed between two layers of a rotor winding associated with a rotor pole. In some embodiments, the assemblies comprise a tube disposed between each rotor pole and the rotor winding associated with that rotor pole. For example, an assembly can comprise only one tube to be disposed between all rotor poles and the rotor windings associated with the rotor poles; and in other embodiments, an assembly can comprise a plurality of tubes, each to be disposed between a rotor pole and the rotor winding associated with that rotor pole (e.g., such that the number of tubes corresponds to the number of rotor poles). In other embodiments, the assemblies comprise a tube disposed between two layers of each rotor winding associated with each rotor pole. As an example, a cooling assembly can have four rotor poles, four rotor windings, and four tubes. In other embodiments, a cooling assembly can have more or less than four rotor poles (e.g., two, six, eight, ten, or more rotor poles), more or less than four rotor windings (e.g., two, six, eight, ten, or more rotor windings), and more or less than four tubes (e.g., two, six, eight, ten, or more tubes). In some embodiments of the present assemblies, the tube is in contact with the rotor winding associated with that rotor pole; and in some embodiments, the tube extends along each side of the rotor pole. In some embodiments, the tube is wrapped around the rotor pole in a helical configuration. In other embodiments, the tube is wrapped around the rotor pole in a serpentine configuration. In some embodiments, the tube is copper; and in some embodiments, the tube is aluminum. In some embodiments, the tube is rectangular. In some embodiments, fluid moving through the assembly (and through the tube) is a refrigerant, a dielectric, and/or a high dielectric.

Some embodiments of the present assemblies further comprise an inlet manifold coupled to an inlet of the tube such that fluid can enter the tube from the inlet manifold and an outlet manifold coupled to an outlet of the tube such that fluid can exit the tube to the outlet manifold. In some embodiments, the assemblies further comprise a rotary union coupled to the inlet manifold and the outlet manifold such that fluid can move between a fluid source and the inlet and outlet manifolds through the rotary union.

Some embodiments of the present assemblies further comprise a first plate coupled to the rotor pole and configured to dissipate heat from the rotor. In some embodiments, the first plate is coupled to the rotor pole such that the first plate extends along the sides of the rotor pole substantially perpendicular to the bore of the rotor core. In some embodiments, the first plate is in contact with at least one of the rotor windings and the tube. Some embodiments further comprise a second plate coupled to the rotor pole and configured to dissipate heat from the rotor, where the first plate and the second plate are substantially parallel, and the first plate is closer to the bore of the rotor core than the second plate. In some embodiments, a first plate is coupled to each of the rotor poles and configured to dissipate heat from the rotor. In some embodiments, a first plate is coupled to each of the rotor poles such that the first plate extends along the sides of each of the rotor poles substantially perpendicular to the bore of the rotor core. In some embodiments, a second plate is coupled to each of the rotor poles and configured to dissipate heat from the rotor, where the first plate and the second plate are substantially parallel, and the first plate is closer to the bore of the rotor core than the second plate. In some embodiments, the first plate and/or the second plate can comprise ceramic, aluminum oxide, and combinations thereof.

Some embodiments of the present assemblies further comprise thermal interface material disposed between the tube and the rotor winding. In some embodiments, the thermal interface material comprises thermal grease; and in some embodiments, the thermal interface material comprises phase change thermal interface material. Some embodiments further comprise vacuum pressure impregnation resin disposed between the tube and the rotor winding.

In some embodiments, the assembly further comprises a fan coupled to the assembly and configured to encourage air to pass over the rotor winding.

Some embodiments of the present methods comprise wrapping a tube in one of a helical configuration and a serpentine configuration such that the tube is configured to accommodate a rotor pole of a rotor; disposing the tube on a rotor pole of a rotor; disposing a rotor winding on the rotor pole such that the tube is disposed between the rotor winding and the rotor pole; and permitting fluid to move through the tube. In some embodiments, the fluid comprises a refrigerant; and in some embodiments, the fluid comprises a dielectric or a high dielectric fluid. Some embodiments of the present methods further comprise coupling a plate to the rotor pole and permitting the plate to dissipate heat from at least one of the rotor core, the rotor pole, and the rotor winding. In some embodiments, the plate comprises ceramic; and in some embodiments, the plate comprises aluminum oxide.

Some embodiments of the present methods comprise wrapping a tube in one of a helical configuration and a serpentine configuration around a rotor pole of a rotor; disposing a rotor winding on the rotor pole such that the tube is disposed between the rotor winding and the rotor pole; and permitting fluid to move through the tube. In some embodiments, the fluid comprises a refrigerant; and in some embodiments, the fluid comprises a dielectric or a high dielectric fluid. Some embodiments of the present methods further comprise coupling a plate to the rotor pole and permitting the plate to dissipate heat from at least one of the rotor core, the rotor pole, and the rotor winding. In some embodiments, the plate comprises ceramic; and in some embodiments, the plate comprises aluminum oxide.

Some embodiments of the present methods comprise wrapping two or more layers of a rotor winding in a helical configuration around a rotor pole of a rotor; disposing a tube between a first layer and a second layer of the rotor winding; and permitting fluid to move through the tube. In some embodiments, the fluid comprises a refrigerant; and in some embodiments, the fluid comprises a dielectric or a high dielectric fluid. Some embodiments of the present methods further comprise coupling a plate to the rotor pole and permitting the plate to dissipate heat from at least one of the rotor core, the rotor pole, and the rotor winding. In some embodiments, the plate comprises ceramic; and in some embodiments, the plate comprises aluminum oxide.

Any embodiment of any of the present cooling assemblies can consist of or consist essentially of—rather than comprise/include/contain/have—any of the described elements and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The term "coupled" is defined as connected, although not necessarily directly, and not necessarily mechanically. Two items are "couplable" if they can be coupled to each other. Unless the context explicitly requires otherwise, items that are couplable are also decouplable, and vice-versa. One non-limiting way in which a first structure is couplable to a second structure is for the first structure to be configured to be coupled (or configured to be couplable) to the second structure.

The terms "a" and "an" are defined as one or more unless this disclosure explicitly requires otherwise.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a cooling assembly, or a component of a cooling assembly, that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

The feature or features of one embodiment may be applied to other embodiments, even though not described or illustrated, unless expressly prohibited by this disclosure or the nature of the embodiments.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The embodiments of the present cooling assemblies and their components shown in the figures are drawn to scale for at least the embodiments shown.

DESCRIPTION OF ILLUSTRATIVE EMBODIMENTS

Figure 1:
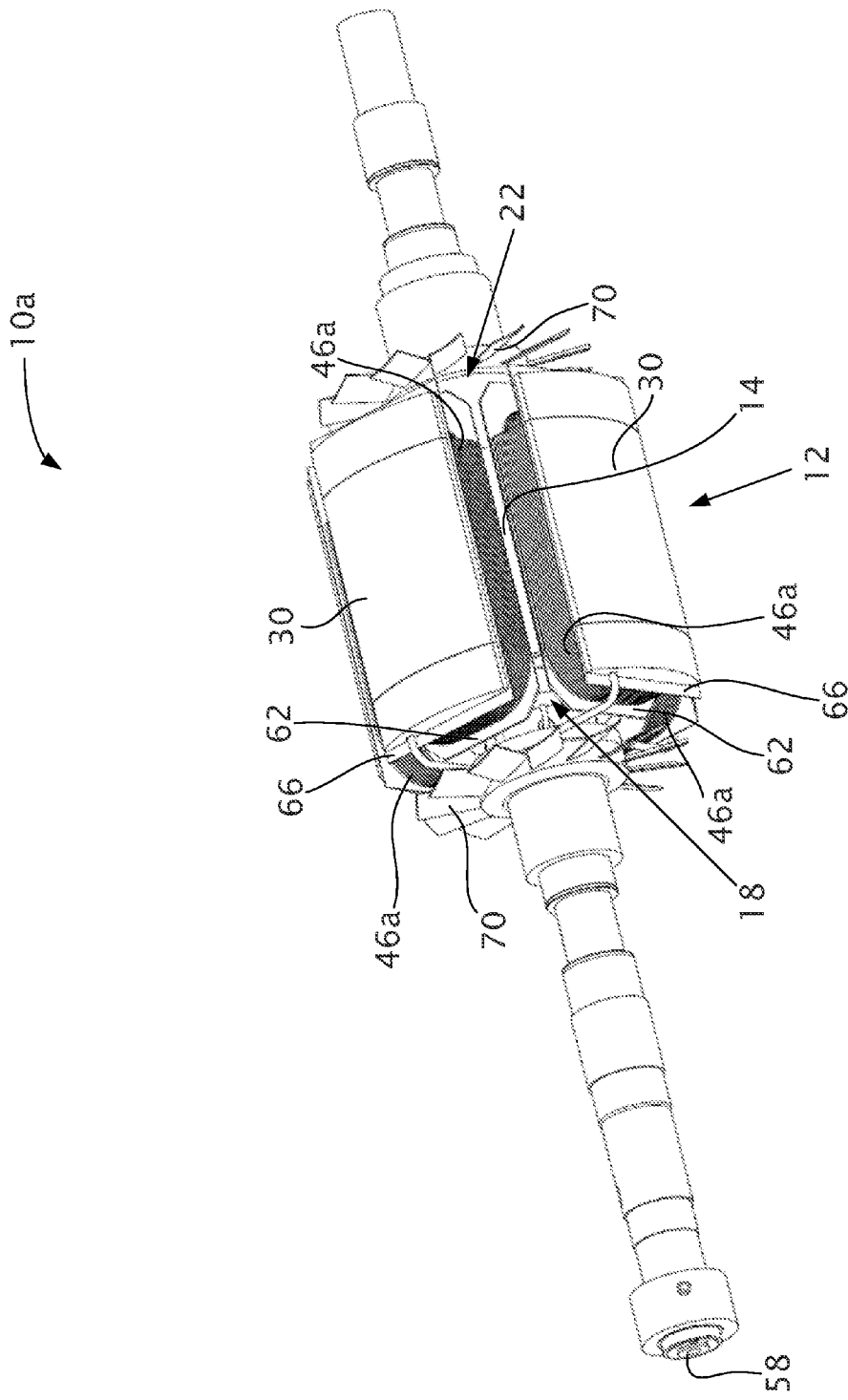
FIG. 1 depicts a perspective view of a portion of a first embodiment of the present cooling assemblies.

Referring now to FIGS. 1-7, designated by reference numerals 10a, 10b, and 10c are embodiments of the present cooling assemblies. Some differences and similarities in the assemblies are described in this disclosure. While some differences in the assemblies are described, additional differences may be depicted in the figures. In the same way, though some similarities in the assemblies are described, additional similarities may be depicted in the figures; and, thus, assemblies 10b and 10c can be configured to have the same or similar characteristics and/or functions as assembly 10a, even if not explicitly described in this disclosure. Cooling assemblies 10a, 10b, and 10c are configured to increase power density of an electric machine from the power density the machine would have without it by, for example, lowering an operating temperature of the electric machine to permit the machine to operate at a higher power level without overheating. As another example, cooling assemblies 10a, 10b, and 10c can cool an electric machine without a cooling jacket and/or a heat exchanger, thus potentially: decreasing weight and/or size of the electric machine and reducing or eliminating issues relating to the high shrink fit pressure of a jacket frame; eliminating the need to machine an outer diameter and jacket inner diameter that optimizes fluid cooling performance, and the like; though in some embodiments, a cooling jacket can cooperate with cooling assemblies 10a, 10b, and 10c to provide additional cooling, if desired, to an electric machine.

In the embodiments shown, each of cooling assemblies 10a, 10b, and 10c comprises rotor 12. Rotor 12 comprises rotor core 14, which has first end 18, second end 22, and rotor bore 26 extending from first end 18 to second end 22. Rotor 12 can be configured to be coupled to a stator of an electric machine. For example, a stator can be configured to at least partially accommodate rotor 12 in a bore of the stator. Rotor 12 can comprise a single piece of material (e.g., a solid rotor) or can be comprised of a plurality of laminations (e.g., assembled (e.g., stacked) together by riveting, bolting, welding, bonding, brazing, dimpling, and/or via end plates). Rotor 12 can comprise various materials, including, for example, silicon steel, carbon steel, cold rolled steel, nickel alloys, cobalt alloys, and the like.

In the embodiments shown, rotor 12 also comprises rotor poles 30 extending at least partially from first end 18 to second end 22 of rotor core 14. In the embodiments shown, rotor 12 comprises four rotor poles 30; however, in other embodiments, rotor 12 can comprise more or less rotor poles (e.g., two, six, eight, ten, or more rotor poles 30). In some embodiments, rotor poles 30 can be coupled to rotor core 14 (e.g., if rotor 12 is solid); and, in other embodiments, rotor poles 30 can be integral with rotor core 14 (e.g., if rotor 12 comprises a plurality of laminations). In the embodiments shown, each of rotor poles 30 comprises sides 34 and top portion 38. In the embodiments shown in FIGS. 1-4 and 6-7, rotor 12 further comprises rotor windings 42a and 42c associated with rotor poles 30. Cooling assembly 10b depicted in FIG. 5 can similarly comprise rotor windings associated with rotor poles 30, though not explicitly depicted. In the embodiments shown, a rotor winding is associated with each of rotor poles 30. For example, in the embodiment shown in FIGS. 3-4, rotor windings 42a extend along sides 34 of each of rotor poles 30 (e.g., between top portion 38 of rotor pole 30 and rotor core 14). In the embodiments shown in FIGS. 1-4 and 6-7, each rotor winding 42a is wrapped around each rotor pole 30 to form several layers of rotor winding. Each rotor winding can comprise any suitable material, such as, for example, copper.

Figure 2:
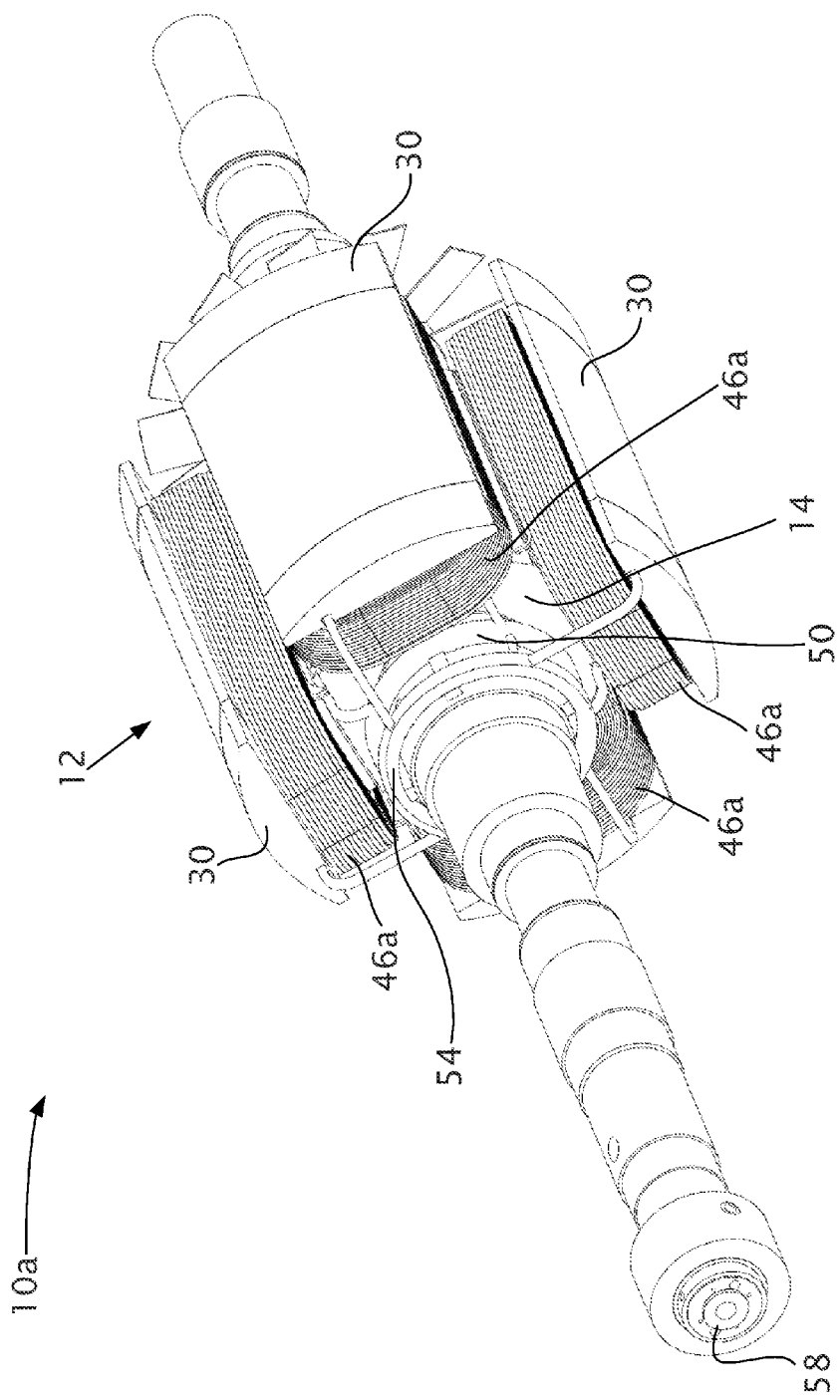
FIG. 2 depicts another perspective view of a portion of the cooling assembly of FIG. 1.
Figure 3:
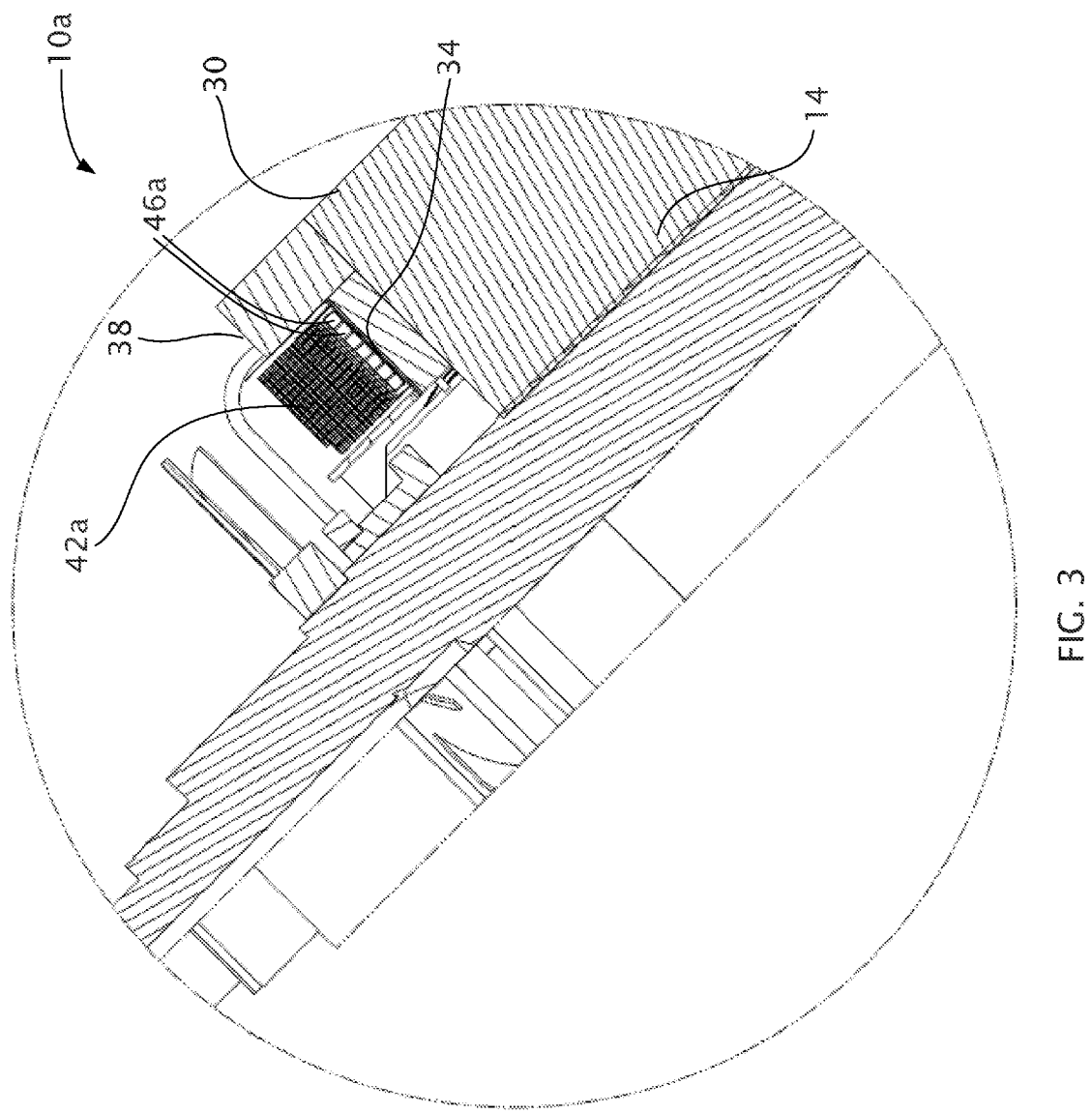
FIG. 3 depicts a side, cross-sectional view of a portion of the cooling assembly of FIG. 1.
Figure 4:
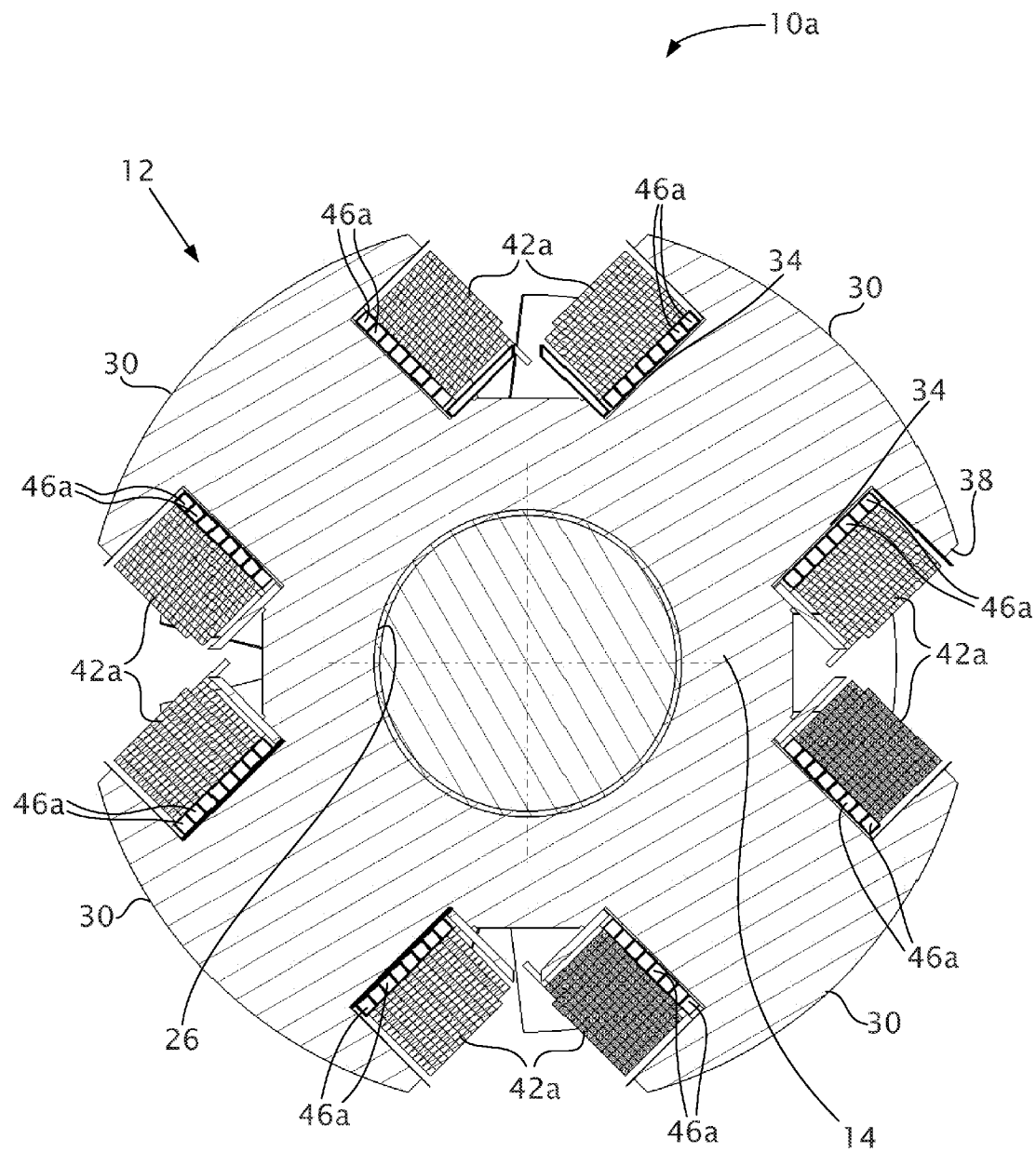
FIG. 4 depicts a front, cross-sectional view of a portion of the cooling assembly of FIG. 1.

In the embodiment shown in FIGS. 1-4, assembly 10a further comprises tube 46a disposed between a rotor pole 30 and a rotor winding 42a associated with that rotor pole 30. In the embodiment shown, tube 46a is disposed between each rotor pole 30 and the rotor winding associated with that rotor pole. In some embodiments, assembly 10a comprises only one tube 46a to be disposed between all rotor poles 30 and the rotor winding associated with each rotor pole; and in some embodiments, assembly 10a comprises a plurality of tubes 46a (e.g., two, four, six, eight, ten or more tubes 46a), each to be disposed between a rotor pole and the rotor winding associated with that rotor pole (e.g., such that the number of tubes 46a corresponds to the number of rotor poles 30). In the embodiment shown, tube 46a extends along at least a portion of sides 34 of a rotor pole 30 (e.g., as depicted in FIGS. 3-4). In some embodiments, one or more tubes 46a extend along at least a portion of sides 34 of a rotor pole 30. FIGS. 1-2 depict assembly 10a without rotor windings 42a to provide a view of tube 46a. In the embodiment shown, a tube 46a is wrapped around each rotor pole 30 in a helical configuration; however, in other embodiments, a tube 46a can be wrapped in such a configuration around a portion of rotor pole 30 (and more specifically, along a portion of sides 34). In some embodiments, tube 46a is in contact with rotor winding 42a; and in other embodiments, tube 46a does not contact rotor winding 42a, but is disposed such that heat can transfer from rotor winding 42a to tube 46a and into fluid moving in tube 46a.

Tube 46a can comprise any suitable material configured to permit and/or encourage heat to transfer to tube 46a, and thus, into fluid moving in tube 46a, such as, for example, copper, aluminum, steel alloys thereof, and the like. Similarly, tube 46a can comprise any suitable shape (e.g., rectangular, in the embodiment shown) to permit and/or encourage heat to transfer to tube 46a, such as, for example, by increasing a surface area of tube 46a in contact with rotor winding 42a, rotor pole 30, and/or other components of assembly 10a described in detail below. Assembly 10a (and more specifically, tube 46a) is configured to permit fluid, such as single- or two-phase fluid, to move through the assembly. Such fluid (and fluid mixtures) can include, for example, gas (e.g., air), liquid (e.g., water), refrigerants (e.g., R-134a and R-22), dielectric and high dielectric fluids (e.g., glycol/water mixtures, polyalphaolefin (PAO), 3M™ Novec™ 7600), other fluids, and combinations thereof.

Figure 5:
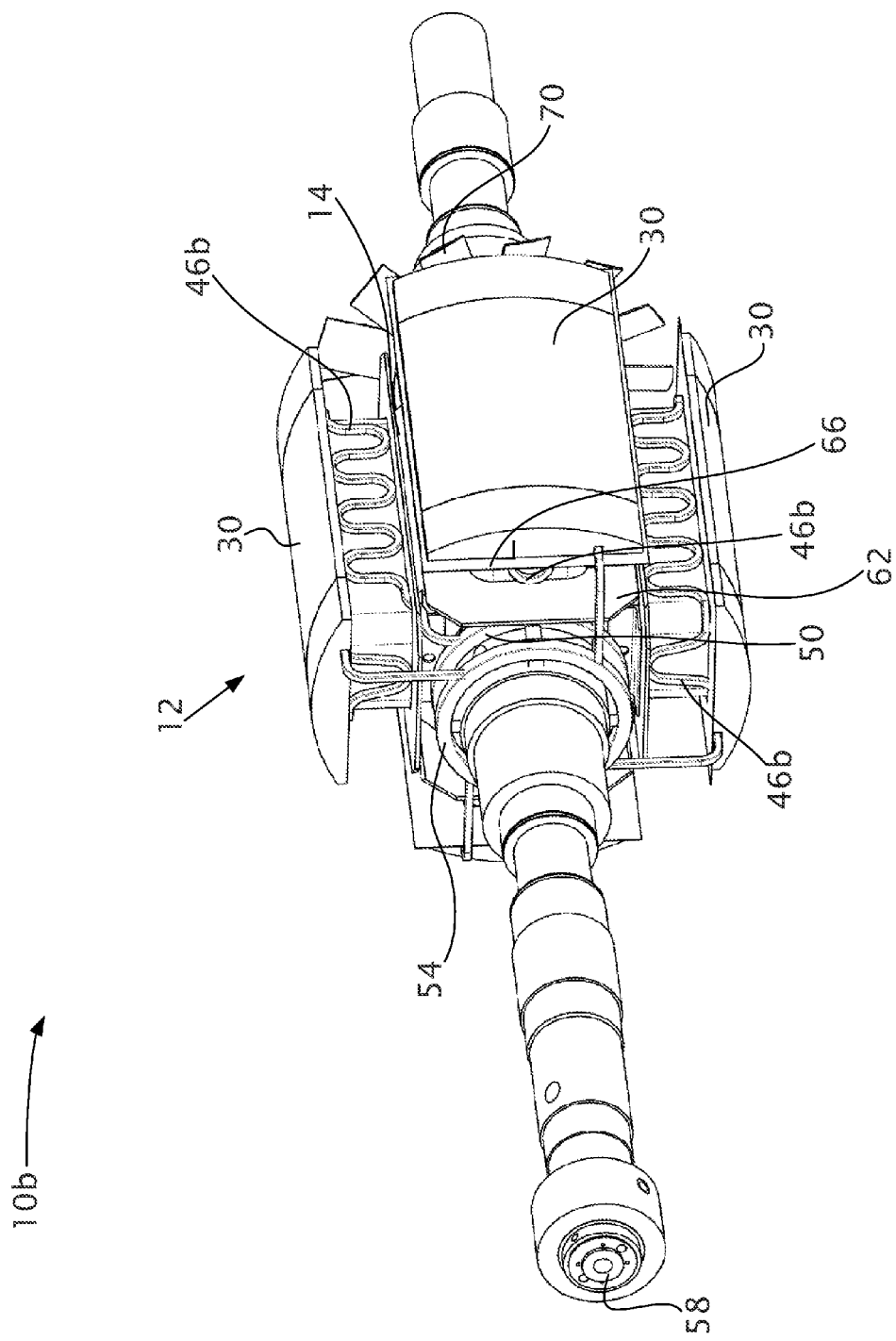
FIG. 5 depicts a perspective view of a portion of a second embodiment of the present cooling assemblies.

In the embodiment shown in FIG. 5, assembly 10b comprises tube 46b configured to be disposed between a rotor pole 30 and a rotor winding associated that rotor pole 30. FIG. 5 depicts assembly 10b without rotor windings to provide a view of tube 46b. In the embodiment shown, tube 46b is configured to be disposed between each rotor pole 30 and a rotor winding associated with that rotor pole. In some embodiments, assembly 10b comprises only one tube 46b to be disposed between all rotor poles 30 and the rotor winding associated with each rotor pole; and in some embodiments, assembly 10b comprises a plurality of tubes 46b (e.g., two, four, six, eight, ten or more tubes 46b), each to be disposed between a rotor pole and the rotor winding associated with that rotor pole (e.g., such that the number of tubes 46b corresponds to the number of rotor poles 30). In the embodiment shown, tube 46b extends along at least a portion of sides 34 of a rotor pole 30. In some embodiments, one or more tubes 46b extend along at least a portion of sides 34 of a rotor pole 30. In the embodiment shown, a tube 46b is wrapped around each rotor pole 30 in a serpentine configuration (e.g., oscillating from, for example, rotor core 14 to top portion 38 of rotor pole 30); however, in other embodiments, a tube 46b can be wrapped in such a configuration around a portion of rotor pole 30 (and more specifically, along a portion of sides 34). In some embodiments, tube 46b is in contact with a rotor winding; and in other embodiments, tube 46b does not contact a rotor winding, but is disposed such that heat can transfer from the rotor winding to tube 46b and into fluid moving in tube 46b.

As with other tubes described in this disclosure, tube 46b can comprise any suitable material configured to permit and/or encourage heat to transfer to tube 46b, and thus, into fluid moving in tube 46b, such as, for example, copper, aluminum, steel alloys thereof, and the like. Similarly, tube 46b can comprise any suitable shape (e.g., rectangular, in the embodiment shown) to permit and/or encourage heat to transfer to tube 46b, such as, for example, by increasing a surface area of tube 46b in contact with a rotor winding, rotor pole 30, and/or other components of assembly 10b described in detail below. Assembly 10b (and more specifically, tube 46b) is configured to permit fluid, such as single- or two-phase fluid, to move through the assembly. Such fluid (and fluid mixtures) can include, for example, gas (e.g., air), liquid (e.g., water), refrigerants (e.g., R-134a and R-22), dielectric and high dielectric fluids (e.g., glycol/water mixtures, polyalphaolefin (PAO), 3M™ Novec™ 7600), other fluids, and combinations thereof.

Figure 6:
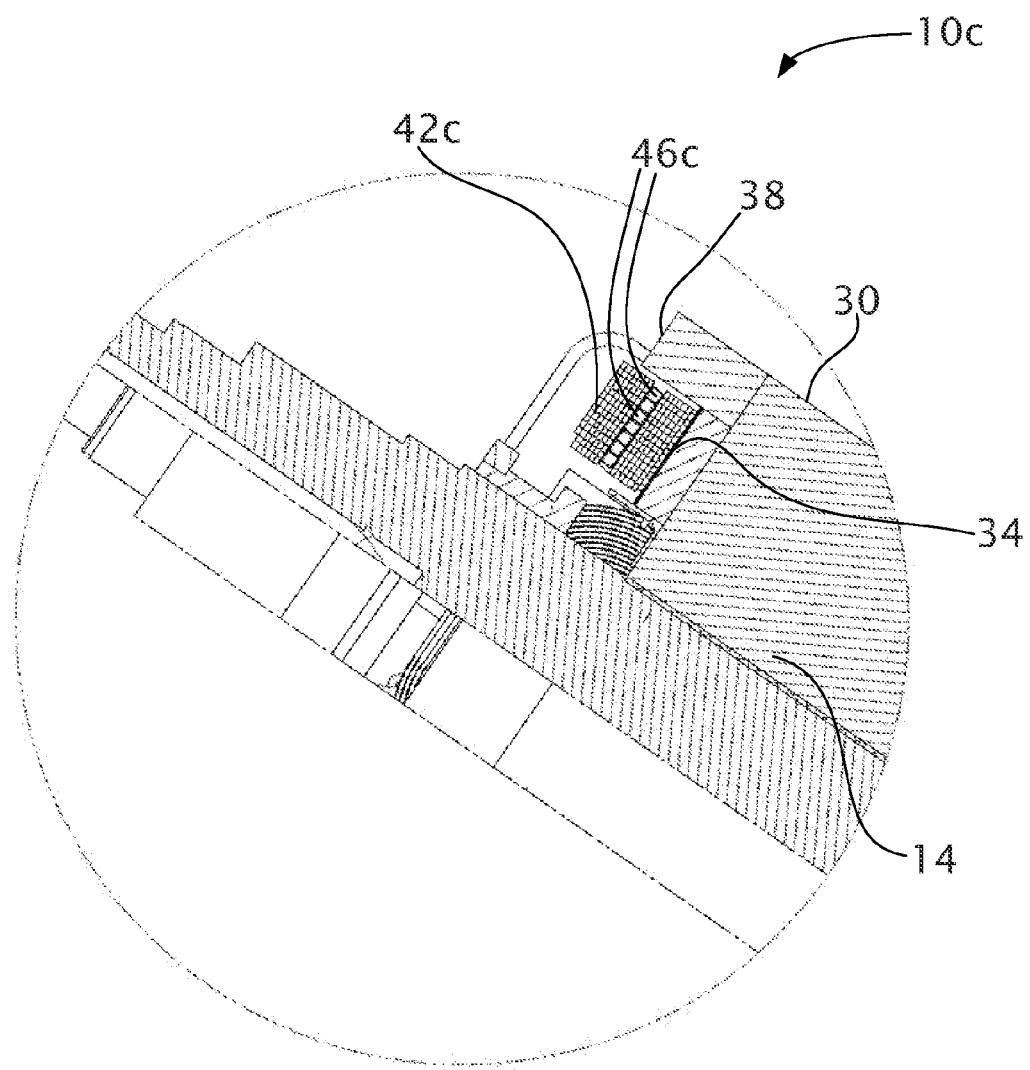
FIG. 6 depicts a side, cross-sectional view of a portion of a third embodiment of the present cooling assemblies.
Figure 7:
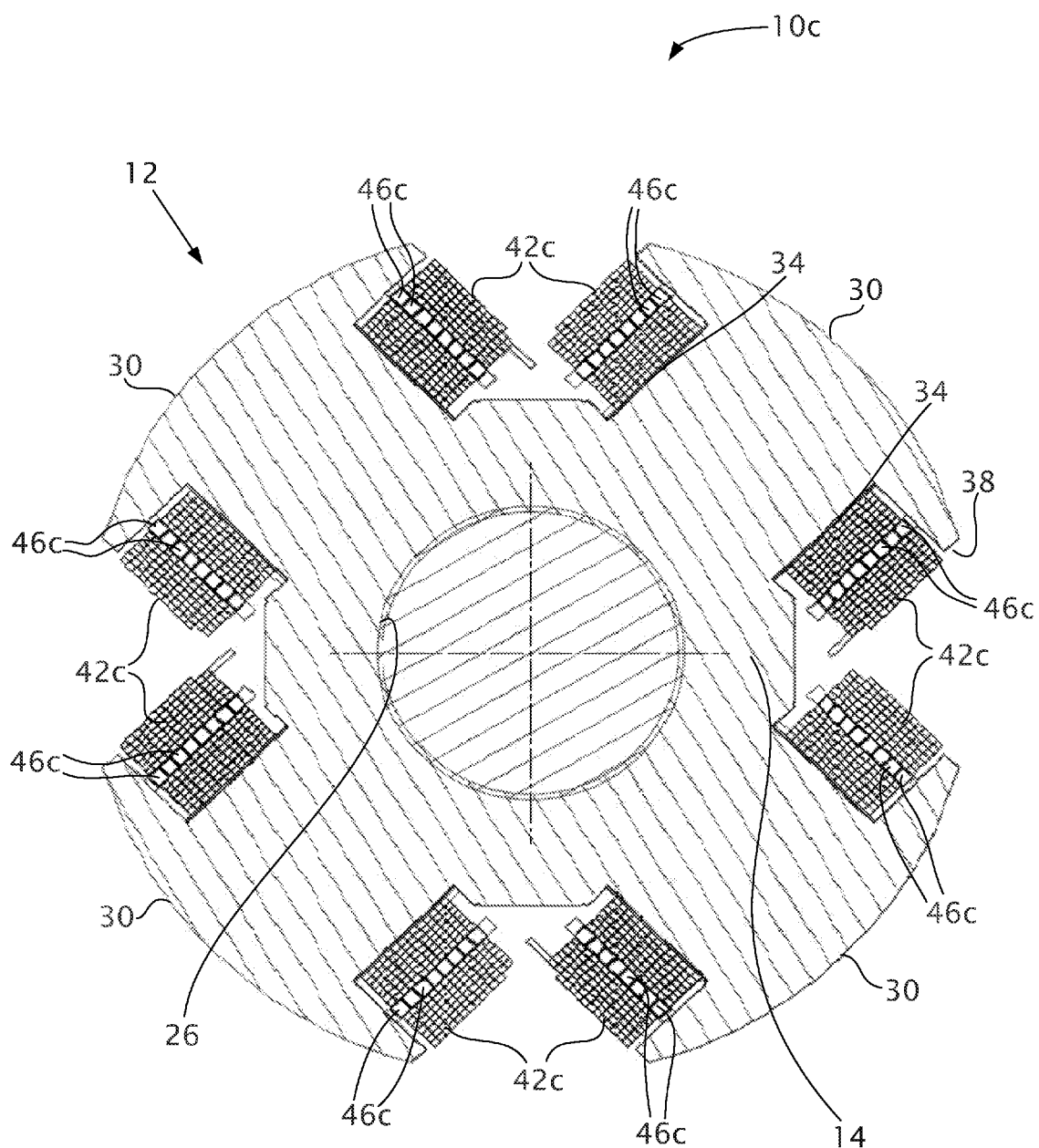
FIG. 7 depicts a front, cross-sectional view of a portion of the cooling assembly of FIG. 6.

In the embodiment shown in FIGS. 6-7, assembly 10c comprises tube 46c disposed between two layers of a rotor winding 42c associated a with rotor pole 30. In the embodiment shown, tube 46c is disposed between two layers of each rotor winding 42c associated with each rotor pole 30. In some embodiments, assembly 10c comprises only one tube 46c to be disposed between two layers of each rotor winding 42c associated with each rotor pole 30; and in some embodiments, assembly 10c comprises a plurality of tubes 46c (e.g., two, four, six, eight, ten or more tubes 46c), each to be disposed between two layers of each rotor winding 42c associated with each rotor pole 30 (e.g., such that the number of tubes 46c corresponds to the number of rotor poles 30). In the embodiment shown, each of rotor windings 42c and tube 46c extends along at least a portion of sides 34 of a rotor pole 30. In some embodiments, one or more tubes 46c extend along at least a portion of sides 34 of a rotor pole 30. In the embodiment shown, each of tubes 46c and windings 42c are wrapped in a helical configuration. In some embodiments, tube 46c is in contact with rotor winding 42c; and in other embodiments, tube 46c does not contact rotor winding 42c, but is disposed such that heat can transfer from rotor winding 42c to tube 46c and into fluid moving in tube 46c.

As with other tubes described in this disclosure, tube 46c can comprise any suitable material configured to permit and/or encourage heat to transfer to tube 46c, and thus, into fluid moving in tube 46c, such as, for example, copper, aluminum, steel alloys thereof, and the like. Similarly, tube 46c can comprise any suitable shape (e.g., rectangular, in the embodiment shown) to permit and/or encourage heat to transfer to tube 46c, such as, for example, by increasing a surface area of tube 46c in contact with a rotor winding 42c, rotor pole 30, and/or other components of assembly 10c described in detail below. Assembly 10c (and more specifically, tube 46c) is configured to permit fluid, such as single- or two-phase fluid, to move through the assembly. Such fluid (and fluid mixtures) can include, for example, gas (e.g., air), liquid (e.g., water), refrigerants (e.g., R-134a and R-22), dielectric and high dielectric fluids (e.g., glycol/water mixtures, polyalphaolefin (PAO), 3M™ Novec™ 7600), other fluids, and combinations thereof.

In the embodiments shown in FIGS. 1-5, each of assemblies 10a and 10b comprises inlet manifold 50 and outlet manifold 54. Cooling assembly 10c depicted in FIGS. 6-7 can similarly comprise an inlet manifold and outlet manifold, though not explicitly depicted. Inlet manifold 50 can be coupled to an inlet of any of tubes 46a, 46b, and 46c such that fluid can enter each of tubes 46a, 46b, and 46c from inlet manifold 50 (in each respective assembly). Similarly, outlet manifold 54 can be coupled to an outlet of any of tubes 46a, 46b, and 46c such that fluid can exit each of tubes 46a, 46b, and 46c to outlet manifold 54 (in each respective assembly).

In the embodiments shown in FIGS. 1-5, each of assemblies 10a and 10b further comprises rotary union 58 coupled to rotor 12, inlet manifold 50, and outlet manifold 54. Cooling assembly 10c depicted in FIGS. 6-7 can similarly comprise a rotary union, though not explicitly depicted. Rotary union 58 is coupled to inlet manifold 50 and outlet manifold 54 such that fluid can move between a fluid source (e.g., a fluid reservoir) and inlet manifold 50 and outlet manifold 54 (and, therefore, into and out of tube(s) 46a, 46b, and 46c, in each respective assembly) through rotary union 58.

In the embodiments shown in FIGS. 1-5, each of assemblies 10a and 10b further comprises first plate 62 and second plate 66 coupled to each of rotor poles 30. Cooling assembly 10c depicted in FIGS. 6-7 can similarly comprise first plates and second plates, though not explicitly depicted. In some embodiments, each of assemblies 10a, 10b, and 10c may comprise one of first plate 62 and second plate 66; and in some embodiments, first plate 62 and/or second plate 66 can be coupled to one or more of rotor poles 30. In the embodiments shown, first plate 62 and second plate 66 extend along sides 34 of each of rotor poles 30 such that first plate 62 and second plate 66 are substantially perpendicular to bore 26 of rotor core 14 and are substantially parallel to one another. First plate 62 and/or second plate 66 can be configured (e.g., via material and orientation) to dissipate heat from rotor 12 (e.g., rotor core 14, rotor poles 30, and/or rotor windings), such as, for example, by permitting heat to transfer rotor 12, through first plate 62 and/or second plate 66, and into corresponding tube(s). In some embodiments, first plate 62 and/or second plate 66 is in contact with at least one of a rotor winding and a tube at a given rotor pole 30. First plate 62 and second plate 66 can comprise a high thermal conductivity and a high dielectric strength. For example, first plate 62 and second plate 66 can comprise any suitable material to permit and/or encourage heat to transfer from rotor 12 to a tube (e.g., through first plate 62 and/or second plate 66), such as ceramic (e.g., alumina, high purity alumina, and beryllia) and aluminum oxide.

Each of assemblies 10a, 10b, and 10c can further comprise thermal interface material disposed on and/or between its various components to, for example, reduce thermal contact resistance. For example, thermal interface material may be disposed on any of tubes 46a, 46b, and 46c, rotor windings, plates 62 and 66, and/or rotor 12. In some embodiments, vacuum pressure impregnation (VPI) resin (e.g., epoxy, polyester, combinations thereof, and the like) can also be disposed on and/or between various components of each of assemblies 10a, 10b, and 10c to, for example, substantially fill gaps between components (e.g., tube(s) and rotor winding(s)) and, therefore, reduce contact resistance. Thermal interface material can include, for example, thermal greases (e.g., silicone-based greases, sodium silicate-based greases, and polyethylene glycol-based greases), resilient thermal conductors (e.g., conducting particle filled elastomers), solder, thermal fluids (e.g., mineral oil), phase change thermal interface materials, and the like. In some embodiments, thermal interface material can have a high fluidity to minimize the thickness of thermal interface material after being disposed on components of the assemblies. In other embodiments, thermal interface material can have a high filler content to, for example, increase thermal contact and/or conductivity between components of the assemblies.

In some embodiments, each of assemblies 10a, 10b, and 10c further comprises one or more fan 70 (in the embodiments shown in FIGS. 1-5). Fan 70 can be coupled to assemblies 10a, 10b, and 10c and configured to encourage air to pass over components of the assemblies (e.g., rotor windings, rotor core 14, rotor poles 30, and/or tube(s)). Fan 70 can be coupled to, for example, rotor core 14 and/or rotary union 58 such that fan 70 can provide further cooling to assemblies 10a, 10b, and 10c, for example, by conduction.

As described in detail above, certain components of assemblies 10a, 10b, and 10c can comprise various thermally conductive materials (e.g., metals and non-metals) configured to improve heat transfer through such components, including, but not limited to, steel, carbon steel, aluminum, copper, silver, gold, lead, and combinations and/or alloys thereof. In other embodiments, however, certain components of assemblies 10a, 10b, and 10c can comprise materials of lower conductivity. Further, such components can comprise thin, light weight, and/or low density materials to improve heat transfer and/or minimize weight of the assemblies.

The present disclosure also includes various cooling methods. Such methods comprise wrapping a tube in one of a helical configuration (e.g., tube 46a) and a serpentine configuration (e.g., tube 46b) such that the tube is configured to accommodate a rotor pole of a rotor; disposing the tube on a rotor pole (e.g., rotor pole 30) of a rotor (e.g., rotor 12); disposing a rotor winding (e.g., rotor winding 42a) on the rotor pole such that the tube is disposed inside the rotor winding with respect to the rotor pole; and permitting fluid (e.g., a refrigerant, dielectric fluid, high dielectric fluid, and other fluids previously disclosed) to move through the tube. In some embodiments, the method further comprises coupling a plate (e.g., first plate 62 and/or second plate 66) to the rotor pole and permitting the plate to dissipate heat from at least one of the rotor core, the rotor poles, and the rotor winding. In some embodiments, the plate comprises ceramic, aluminum oxide, a combination thereof, and/or other materials previously disclosed.

Some embodiments of the present methods comprise wrapping a tube in one of a helical configuration (e.g., tube 46a) and a serpentine configuration (e.g., tube 46b) around a rotor pole (e.g., rotor pole 30) of a rotor (e.g., rotor 12); disposing a rotor winding on the rotor pole such that the tube is disposed inside the rotor winding with respect to the rotor pole; and permitting fluid (e.g., a refrigerant, dielectric fluid, high dielectric fluid, and other fluids previously disclosed) to move through the tube. In some embodiments, the method further comprises coupling a plate (e.g., first plate 62 and/or second plate 66) to the rotor pole and permitting the plate to dissipate heat from at least one of the rotor core, the rotor poles, and the rotor winding. In some embodiments, the plate comprises ceramic, aluminum oxide, combination thereof, and/or other materials discussed throughout this disclosure.

Some embodiments of the present methods comprise wrapping two or more layers of a rotor winding in a helical configuration around a rotor pole (e.g., rotor pole 30) of a rotor (e.g., rotor 12); disposing a tube (e.g., tube 46c) between a first layer and a second layer of the rotor winding; and permitting fluid (e.g., a refrigerant, dielectric fluid, high dielectric fluid, and other fluids previously disclosed) to move through the tube. In some embodiments, the method further comprises coupling a plate (e.g., first plate 62 and/or second plate 66) to the rotor pole and permitting the plate to dissipate heat from at least one of the rotor core, the rotor poles, and the rotor winding. In some embodiments, the plate comprises ceramic, aluminum oxide, combination thereof, and/or other materials discussed throughout this disclosure.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A cooling assembly for an electric machine comprising:
   a rotor comprising:
      a rotor core having:
         a first end;
         a second end; and
         a rotor bore extending from the first end to the second end;
      rotor poles extending at least partially from the first end to the second end of the rotor core, each rotor pole having sides; and
      a rotor winding associated with each rotor pole; and
   a tube wrapped multiple times around a rotor pole such that at least two wraps of the tube are stacked in a direction that is parallel to the rotor pole height and disposed between two layers of the rotor winding associated with that rotor pole;
   where the rotor winding associated with that rotor pole has a bottom and no portion of the at least two wraps of the tube extends beyond the bottom, the at least two wraps are adjacent to each other, and flow through the at least two wraps will be in a same relative direction.

2. The cooling assembly of claim 1, further comprising:
   a tube disposed between two layers of each rotor winding associated with each rotor pole.

3. The cooling assembly of claim 1, where each of the rotor winding and the tube is in a helical configuration.

4. The cooling assembly of claim 1, further comprising:
   a first plate coupled to the rotor pole and configured to dissipate heat from the rotor.

5. The cooling assembly of claim 4, further comprising:
   a second plate coupled to the rotor pole and configured to dissipate heat from the rotor,
   where the first plate and the second plate are substantially parallel, and the first plate is closer to the bore of the rotor core than the second plate.

6. The cooling assembly of claim 4, where the first plate and the second plate comprise at least one of ceramic and aluminum oxide.

7. The cooling assembly of claim 1, where the tube is one of copper and aluminum.

8. The assembly of claim 1, where when fluid moves through the tube, the fluid comprises one of a refrigerant, a dielectric fluid, and a high dielectric fluid.

* * * * *